United States Patent [19]
Reid et al.

[11] 3,761,523
[45] Sept. 25, 1973

[54] PROCESS FOR PREPARING BIS-(HYDROXYALKYL) SECONDARY ALKYL AMINES

[75] Inventors: Robert E. Reid, Glenham; Ting P. Chen, Wappingers Falls; Frank K. Ward, Hopewell Junction, all of N.Y.

[73] Assignee: Texaco, Inc., New York, N.Y.

[22] Filed: Jan. 7, 1972

[21] Appl. No.: 216,251

[52] U.S. Cl. .......................................... 260/584 R
[51] Int. Cl. ........................................... C07c 89/02
[58] Field of Search ................................ 260/584 R

[56] References Cited
FOREIGN PATENTS OR APPLICATIONS

| | | | |
|---|---|---|---|
| 2,002,209 | 11/1970 | Germany | 260/584 R |
| 998,510 | 6/1965 | Great Britain | 260/584 |

*Primary Examiner*—Lewis Gotts
*Assistant Examiner*—D. R. Phillips
*Attorney*—Thomas H. Whaley

[57] ABSTRACT

A process for preparing bis-(hydroxyalkyl) secondary alkyl amines which comprises reacting, at elevated temperatures and pressures, secondary alkyl primary amines with alkylene oxides in the presence of a phenol catalyst.

2 Claims, No Drawings

PROCESS FOR PREPARING BIS-(HYDROXYALKYL) SECONDARY ALKYL AMINES

BACKGROUND OF THE INVENTION

Bis-hydroxyalkyl amines, and notably bis-hydroxyethyl amines, function as cationic surfactants and, accordingly, are widely used in the textile and surfactant industries. The compounds also are effective metal corrosion inhibitors and are used, for example, in petroleum refining operations where they are injected into the unit in order to protect the metal surfaces against the attack of water, hydrogen sulfide, hydrogen chloride, carbon dioxide and sulfur oxides. The bis-hydroxyalkylated derivatives of secondary alkyl amines are particularly effective in these applications.

Prior art methods for preparing such bis-hydroxyalkylated amines have involved reacting the amine with alkylene oxide in the presence of a basic catalyst such as alkali metal hydroxides, RONa (R=CH$_3$,C$_2$H$_5$), metallic sodium, and the like; an acidic catalyst such as SbCl$_5$, BF$_3$, p-toluene sulfonic acid and the like; or without catalytic assistance. However, certain difficulties have been encountered with these procedures. Thus, these prior art procedures have concentrated on the use of primary alkyl primary amine reactants rather than on secondary alkyl primary amines which tend to be more difficult to react. The use of basic and acidic catalysts has resulted in the formation of large amounts of reaction by-products rather than a predominance of the desired bis-hydroxyalkylated materials. Conducting the reaction in the absence of catalysts has often resulted in the total absence of reaction or the necessary adoption of more stringent reaction conditions.

SUMMARY OF THE INVENTION

It is the primary object of this invention to provide an effective process for the preparation of bis-(hydroxyalkyl) secondary alkyl amines.

It is the further object to provide a suitable catalyst system for the process which will insure formation of the desired product in high yields.

Other objects and advantages of this invention will be readily apparent from the following detailed description thereof.

We have now, surprisingly, found that the use of a phenol catalyst in the reaction between (secondary alkyl) primary amines and alkylene oxides results in the preparation of the desired bis-(hydroxyalkyl) secondary alkyl amines in yields which generally exceed about 70 percent. Thus, the use of such phenol catalysts in contrast to the prior art catalyst systems substantially eliminates the difficulties previously encountered, namely, the lack of reaction with certain amines and the formation of large amounts of undesirable by-products.

DESCRIPTION OF THE PREFERRED EMBODIMENTS

The following equation depicts the novel reaction procedure of this invention:

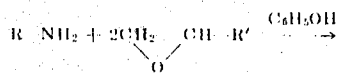

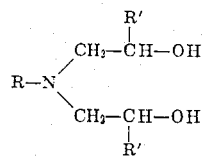

wherein R is a secondary alkyl radical having from 10 to 20 carbon atoms; and

R' is selected from hydrogen atoms and alkyl radicals.

As indicated above, secondary alkyl primary amines having from 10 to 20 carbon atoms are applicable for use in the process of this invention. Such secondary alkyl amines are generally prepared by the nitration of normal paraffins followed by the hydrogenation of the resulting nitroparaffins. The amines are often recovered as mixtures of amines exhibiting differing carbon chain lengths, these amine mixtures being perfectly acceptable for subsequent derivatization according to the process of this invention. C$_{10}$ – C$_{14}$ secondary alkyl amine mixtures are preferred.

All available alkylene oxides, e.g. ethylene oxide, propylene oxide and buylene oxide, may be utilized in the process of this invention, although ethylene and propylene oxide are preferred for reasons of economy, availability and ease of reaction.

In more detail, the novel procedure of this invention comprises admixing, in a closed reaction system and in an inert atmosphere such as nitrogen, the (secondary alkyl) primary amine and phenol. The temperature of the system is raised to from about 100° to 115° C., and preferably to about 100° C., whereupon the alkylene oxide is introduced into the system from a pressurized container. The pressure in the closed system will generally increase to about 70 to 150 psig, whereupon the reaction is allowed to proceed for a period of time ranging from about 3 to 9 hours. It should be noted that this time period is indicative of the formation of substantial yields of hydroxyalkyl derivative, although initial formation of product occurs almost immediately. The phenol may be removed by extraction with aqueous base and the product then recovered by any suitable means such as vacuum distillation.

With respect to proportions, the concentrations of the amine and alkylene oxide will generally be determined on the basis of stoichiometric equivalencies of the reaction, with up to about 25% molar excess of alkylene oxide being preferred. The phenol will be present in a concentration ranging from about 5 – 10 mole percent, based on the moles of amine present.

As previously indicated, this process insures the formation of bis-(hydroxyalkyl) secondary alkyl amines. The resulting derivatized amines may be effectively utilized for a variety of applications and notably as textile emulsifiers, nonionic surfactants, chemical intermediates and corrosion inhibitors.

The following examples will further illustrate the embodiment of this invention. In these examples, all parts are given by weight unless otherwise noted.

EXAMPLE I

This example illustrates the manner of conducting the novel process of this invention.

A one liter Parr reactor was charged with 150 parts (0.81 moles) of (C$_{10}$–C$_{14}$ secondary alkyl) primary amine and 3.5 parts (5 mole percent based on amines)

of phenol. The reactor was flushed with nitrogen, sealed and heated to 100° C. The reactor was further charged with 137 parts of propylene oxide (25 mole percent excess). The pressure in the Parr reactor increased to about 70 psig. After a reaction time of one hour the mono-propoxylated derivative had been partially formed and after 3.0 hours a 71 percent yield of the bis adduct had been formed. The reaction was discontinued after 8 hours when gas chromatographic analysis indicated the presence of only the bis adduct.

After removal of the phenol by extraction with aqueous NaOH, the product was distilled between 140 and 185° C. at 7 mm Hg pressure. The bis-(2-hydroxypropyl) $C_{10}$–$C_{14}$ secondary alkyl amines were thus isolated in a 73 mole percent yield.

In contrast, when the above described procedure was identically repeated with the exception that the phenol catalyst was omitted therefrom it was noted, on the basis of gas chromatographic and infra-red analysis, that no bis-(2-hydroxypropyl) $C_{10}$–$C_{14}$ secondary alkyl amine adduct had formed after a reaction period of 2.5 hours.

The advantages resulting from the use of the phenol catalyst are thus readily apparent, it being noted that the phenol insures reactivity with the formation of the desired end products.

EXAMPLE II

A one liter Parr reactor was charged with 185 parts (1.0 mole) of ($C_{10}$–$C_{14}$ sec. alkyl) primary amines and 9.4 parts (0.1 mole) of phenol. The reactor was then heated to 100° C., flushed with nitrogen and sealed. From a pressurized stainless steel transfer cylinder, 110 parts (2.5 moles) of ethylene oxide was slowly added to the reactor. An immediate exotherm and rise in pressure (to about 150 psi) indicated that reaction had occurred. The reaction was discontinued after about 3 hours when a pressure drop was noticed.

The phenol was removed by water washing and the product was distilled between 147 and 172° C. at 0.3 mm Hg. The bis-(2-hydroxyethyl) $C_{10}$–$C_{14}$ secondary alkyl amines were thus isolated in a 71 mole percent yield.

Once again, when the reaction was repeated under identical conditions with the exception that phenol was omitted therefrom, a total absence of reaction was noted as indicated by the lack of exotherm upon addition of the ethylene oxide. The reaction was terminated without formation of the desired amine derivative.

The above described catalytic reaction procedure may be repeated, with comparable results, using any of the prescribed ($C_{10}$–$C_{20}$ secondary alkyl) primary amines.

Summarizing, it is seen that this invention provides a novel process for the preparation of specified amine derivatives. Variations may be made in proportions, procedures and materials without departing from the scope of the invention as defined by the following claims.

What is claimed is:

1. In the process of preparing amine derivatives corresponding to the formula

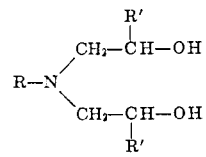

wherein R is a secondary alkyl radical having from 10 to 20 carbon atoms; and

R' is selected from hydrogen atoms and alkyl radicals said process comprising the steps of reacting, in a closed reactor system at elevated temperatures and pressures, each mole of $C_{10}$–$C_{20}$ secondary alkyl primary amines with up to about 25 percent molar excess of alkylene oxide selected from the group consisting of ethylene oxide, propylene oxide and butylene oxide, and recovering the amine derivative, the improvement which comprises conducting said reaction in the presence of phenol, said phenol being present in a molar percent ranging from 5 to 10 mole percent based on the moles of amine present.

2. The process of claim 1, wherein said amine reactant is a $C_{10}$–$C_{14}$ secondary alkyl primary amine mixture.

* * * * *